United States Patent
Hooten et al.

[11] 3,958,666
[45] May 25, 1976

[54] WORN LINING WARNING DEVICE

[75] Inventors: Robert L. Hooten; Norman C. Van De Somple; George L. Koloszar, all of South Bend, Ind.

[73] Assignee: The Bendix Corporation, South Bend, Ind.

[22] Filed: Nov. 11, 1974

[21] Appl. No.: 522,565

[52] U.S. Cl. .............................. 188/1 A; 116/67 R
[51] Int. Cl.² .................... F16D 66/02; G08B 03/00
[58] Field of Search.......... 116/28 R, 67 R, 114 AE; 188/1 A

[56] References Cited
UNITED STATES PATENTS

| | | | |
|---|---|---|---|
| 2,657,772 | 11/1953 | Chamberlain | 188/1 A |
| 3,139,063 | 6/1964 | Rinkerman | 116/67 R |
| 3,141,524 | 7/1964 | Mishler | 188/1 A |
| 3,368,519 | 2/1968 | Ruda | 116/67 R X |
| 3,592,295 | 7/1971 | Kennel | 116/67 R X |
| 3,638,764 | 2/1972 | Anders | 188/1 A |
| 3,716,113 | 2/1973 | Kobayashi et al. | 188/1 A |

*Primary Examiner*—Richard C. Queisser
*Assistant Examiner*—Daniel M. Yasich
*Attorney, Agent, or Firm*—Ken C. Decker; William N. Antonis

[57] ABSTRACT

A worn lining warning indicator used on a disc brake is disclosed. The indicator includes a projection which extends from the edge of the friction element and which wears away as the friction lining wears. A spring arm is carried by the friction element and includes a portion which extends over the periphery of the projection and also over the periphery of the rotor. Initially, when the brake linings are new, the projection on the friction element supports the resilient member away from the periphery of the disc. However, when the linings have worn an amount sufficient to wear the projection away, the resiliency of the member biases the end of the latter into engagement with the periphery of the rotor. The engagement of the resilient member with discontinuities on the rotor periphery produces a unique, pulsating, "picket fence" noise as the rotor rotates to thereby warn the vehicle operator that the brake linings need replacement.

17 Claims, 6 Drawing Figures

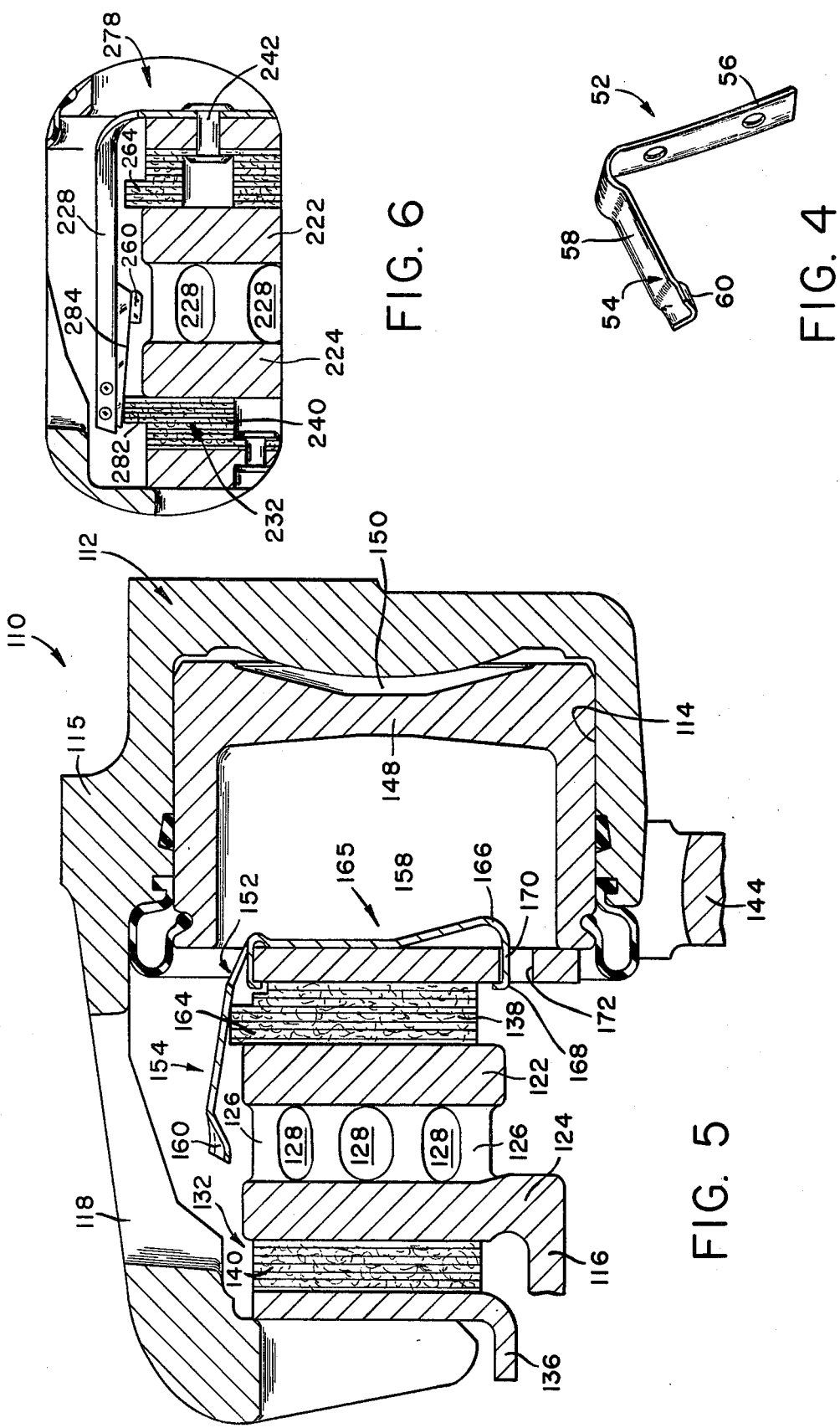

WORN LINING WARNING DEVICE

BACKGROUND OF THE INVENTION

This invention relates to a worn lining wear indicator for a disc brake.

For safety, it is desirable to provide a device which warns the operator of a motor vehicle when the vehicle's brake linings have worn dangerously thin. Of course, when the brake lining has worn completely away, the brake becomes ineffective, and the rivet heads which are sometimes used to fasten the friction material on the backing plate or the backing plate itself come into contact with the brake disc or rotor, thereby damaging the rotor and requiring extremely expensive repairs. Many such brake lining warning devices have been proposed, but few have found commercial acceptance. In general, lining wear indicators have been of two types. Some lining indicators, such as that described in U.S. Pat. No. 3,556,258 and in U.S. Pat. No. 3,675,197, provide an electrical probe embedded in the friction lining which engages the brake disc or rotor after a predetermined amount of lining wear has occurred. Upon engagement of the probe with the grounded brake rotor, a warning device is actuated in the vehicle operator's compartment. Devices of this kind have the disadvantage of being relatively costly, and have the advantage of giving a precise indication of lining wear. The other types of brake lining wear indicators have been the so-called mechanical type, such as that disclosed in U.S. Pat. No. 3,368,519, which mounts a vibrating device on the friction element which, upon engagement with the rotor, makes a screeching noise. Devices of this type have the advantage of being relatively inexpensive, but suffer the disadvantage in that the screeching noise generated by this type of indicator is similar to many other brake noises, and therefore the warning may be overlooked by the vehicle operator.

SUMMARY OF THE INVENTION

Therefore, an important object of our invention is to provide a relatively simple and inexpensive brake lining wear indicator for a disc brake.

Another important object of our invention is to provide a worn lining indicator for a disc brake which does not require any electrical connections.

Still another important object of our invention is to provide a worn lining indicator for a disc brake which generates a unique sound when the brake lining has worn to a predetermined thickness, the sound being such that it cannot be mistaken for other brake noises.

DESCRIPTION OF THE DRAWINGS

FIG. 4 is a perspective view of a lining wear indicator made pursuant to the teachings of our present invention which is used in the disc brake illustrated in FIGS. 1 and 2;

FIG. 5 is a transverse cross-sectional view of a disc brake illustrating a first alternate embodiment of our invention; and FIG. 6 is a view similar to FIG. 2 but illustrating a second alternate embodiment of our invention.

DETAILED DESCRIPTION

Figure 1:
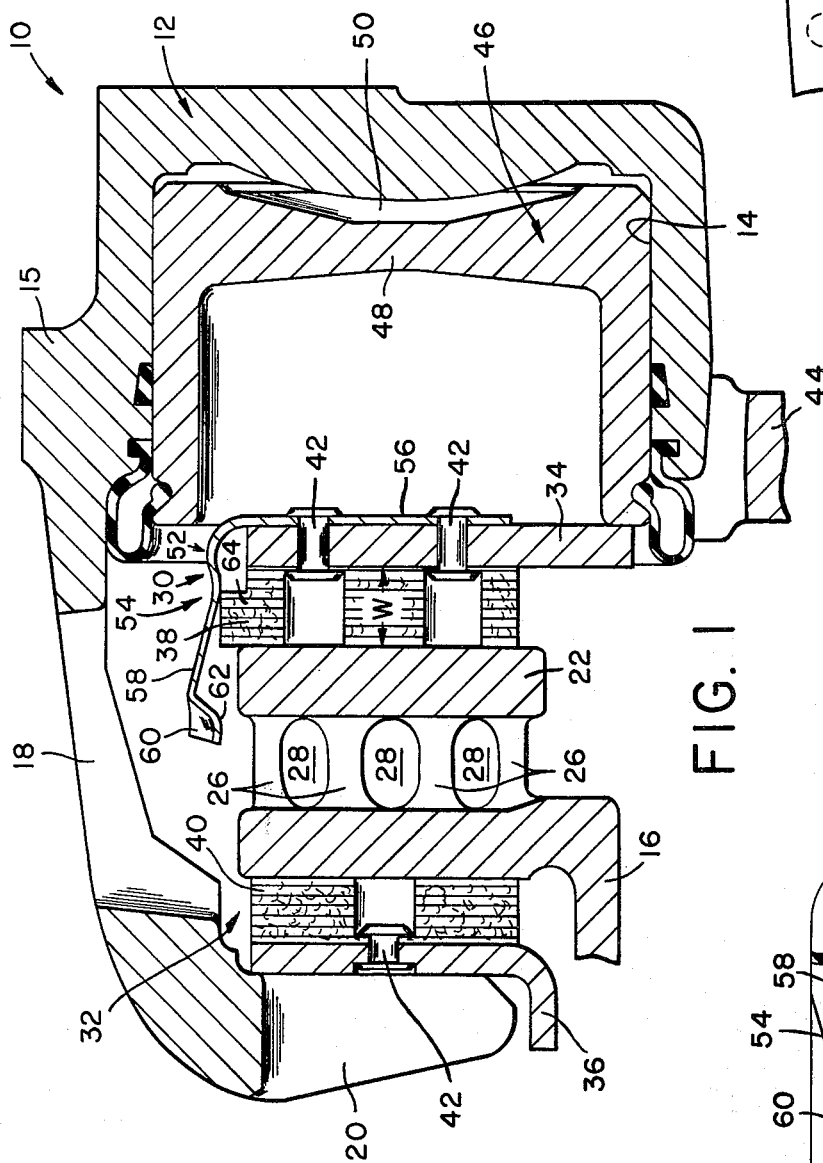
FIG. 1 is a transverse cross-sectional view of disc brake assembly made pursuant to the teachings of our present invention and which illustrates the worn lining indicator in the position which it assumes when the brake linings are new.
Figure 2:
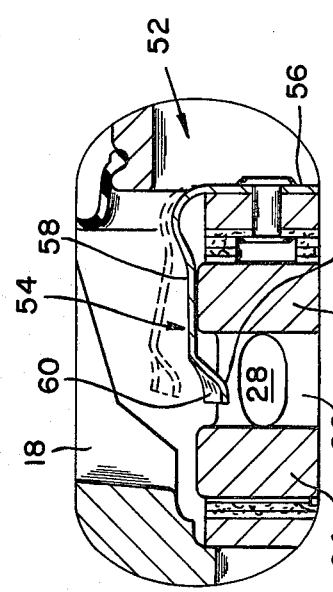
FIG. 2 is a fragmentary cross-sectional view of a portion of FIG. 1, and illustrates the brake lining wear indicator in the position which it assumes after the brake lining has worn to a predetermined thickness.
Figure 3:
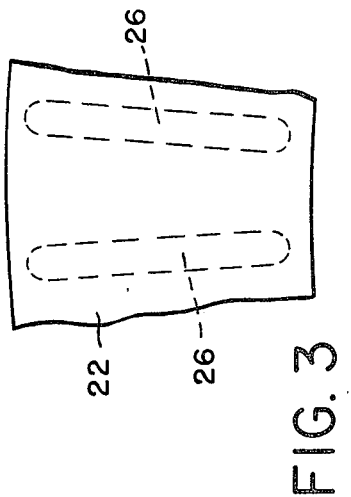
FIG. 3 is a fragmentary side elevational view of the rotor used with the brake in FIGS. 1 and 2 with the vanes used therein illustrated by dashed lines.

Referring now to FIGS. 1–4 of the drawings, a disc brake indicated by the numeral 10 includes a caliper housing 12 which defines a bore 14 therewithin. The caliper housing 12 includes a fluid motor portion 15 which extends on one side of a brake rotor 16, a bridge portion 18 which traverses the periphery of the rotor 16, and a radially inwardly extending portion 20 which is disposed adjacent to the other side of the rotor 16. Rotor 16 is provided with a pair of opposed friction faces 22, 24 which are separated by vanes 26 which define openings 28 therebetween which extend through rotor 16 between the friction faces 22 and 24. The spaces 28 permit flow of air through the rotor to dissipate the heat generated by a brake application. The rotor 16 is identical to brake rotors which have been manufactured for several years and which are now used in many automobiles currently manufactured. A pair of friction elements 30, 32 are mounted adjacent the friction faces 22 and 24, respectively. Each of the friction elements 30, 32 include a metal backing plate 34, 36 to which a block of friction material 38, 40 is secured in any suitable manner, such as by rivets 42. The friction element 32 is secured to the inwardly extending portion 20 of the caliper housing 12. The ends (not shown) of the backing plate 34 of friction element 30 are slidably mounted in the side of a torque member, the bottom of which is illustrated in cross section at 44, in a manner well known to those skilled in the art. The caliper housing 12 is slidably mounted on the torque member 44 for transverse relative movement with respect to the rotor 16 by any suitable manner well known to those skilled in the art, such as the manner described in U.S. Pat. application Ser. No. 99,791, filed Dec. 20, 1970, now U.S. Pat. No. 3,838,753 owned by the assignee of the present invention. Of course, the torque member 44 is rigidly mounted to a nonrotating portion of the vehicle.

A piston 46 is slidably mounted in the bore 14. The closed end 48 of the piston 46 cooperates with the closed end of the housing 12 to define a variable volume fluid chamber 50 therebetween, which is communicated to a suitable fluid pressure source, such as the master cylinder of the vehicle so that, when the vehicle operator initiates a brake application, the fluid pressure generated by the master cylinder will be communicated into the chamber 50. The opposite end of the piston 46 abuts the backing plate 34 of the friction element 30.

The warning device of our invention includes a resilient member generally indicated by the numeral 52, which has a first portion 54 extending generally transversely to the friction faces 22, 24 and which projects over the periphery of the rotor. A second portion 56 of the resilient member 52 extends generally parallel to the friction faces 22 and 24 and is secured to the rear face of the backing plate 34 by the rivets 42. Portion 54 of resilient member 52 includes a relatively flat portion 58 which terminates in a depression 60, the tip 62 of which is adapted to engage the ends of the vanes 26 after a predetermined amount of lining wear, as is more clearly indicated in FIG. 2. The friction material 38 is provided with a projection 64 which extends above the periphery of the rotor and is adapted to engage the portion 54 of the resilient member 52 to hold it off of the rotor. The width of the projection 64, however, is less than the width of the friction material 38, and the projection 64 will consequently be entirely worn away when the friction material 38 is worn sufficiently that only a small amount of friction material remains.

MODE OF OPERATION

When a brake application is effected, the fluid pressure generated in the aforementioned master cylinder (not shown) is transmitted to the chamber 50 when it reacts on the piston 46 to urge the latter to the left viewing FIG. 1. Movement of the piston urges the friction element 30 into braking engagement with the friction face 22. Because of the slidable connection between the caliper housing 12 and the torque member 44, reaction forces generated by fluid pressure in chamber 50 and transmitted through bridge portion 18 and the inwardly extending portion of caliper housing 12 also urge the friction element 32 into braking engagement with the friction face 24, thereby effecting a brake application. Of course, the resilient member 52 is supported by the friction element 34, but the tip 62 of the resilient member 52 is held out of engagement with the rotor 16 by the projection 64. However, as will readily be appreciated by those skilled in the art, repeated brake application will cause the friction material 38 and 40 to wear away. Since the projection 64 is a part of the friction material 38, it will wear away as the friction material 38 wears away. As may be seen in FIG. 2, ultimately the projection 64 will become completely worn away when a very small amount of lining material 38 separates the head of the rivets 42 from the friction face 22. When this occurs, the resiliency of the resilient member 52 urges the tip 62 of the latter into one of the openings 28 between the vanes 26. Therefore, as the rotor 16 rotates with the vehicle wheel, the vanes 66 will successively strike the end of the resilient member 52, thereby vibrating the latter to generate a pulsating, "picket-fence" noise. This pulsating noise is different from any other noise normally generated during braking, and will be readily recognized by the vehicle operator as indication that the brake lining material should be replaced. Furthermore, once the projection 64 is worn away, the noise will be generated continuously whenever the vehicle is moved, whether or not the brake is applied. Of course, when new linings are installed, the new lining will include a projection 64 which will maintain the resilient member 52 out of contact with the rotor 16 until the new linings have worn away.

Some smaller automobiles do not require a ventilated rotor and consequently are provided with a solid rotor. The invention may be used with a solid rotor if discontinuities are provided in the periphery thereof to generate the "picket-fence" sound when engaged by member 52. For example, radial openings may be drilled at several places around the periphery of the rotor.

DETAILED DESCRIPTION OF THE FIRST ALTERNATE EMBODIMENT

Elements in the embodiment of FIG. 5 which are substantially the same as those in embodiment of FIGS. 1–4 retain the same reference numerals, but are increased by 100. The embodiment of FIG. 5 is identical to that of FIGS. 1–4, except that the resilient member 52, instead of being riveted to the rear face of the backing plate 34, includes a clip 165 and a hooked portion 166. The clip 165 and the hooked portion 166 terminate in detents 167, 168, respectively. The axially extending portion 170 of the hooked portion 166 extends through an aperture 172 provided in the portion of the backing plate 34 which is not covered by friction material 38. The detent 168 will thereupon engage the face of the backing plate 34 adjacent the friction face 22. The clip 165 extends around the top of the backing plate 34 so that the detent 167 also engages the face of backing plate 34 adjacent friction face 22. The embodiment of FIG. 5 has the advantage in that it may be installed on the friction element 30 after the friction material 38 has been riveted or otherwise secured to the backing plate 34, which facilitates assembly of the device.

DETAILED DESCRIPTION OF THE SECOND ALTERNATE EMBODIMENT

Elements in the embodiment of FIG. 6 which are substantially the same as those in the embodiment of FIGS. 1–4 retain the same reference numerals, but are increased by 200. The device illustrated in FIG. 6 is similar to the device illustrated in FIGS. 1–4, but is adapted to sense wear of the lining material on the outer brake shoe. Resilient member 278 includes a leaf spring 228 which extends over the periphery of the rotor and rests on a projection 282 extending from friction material 240 on brake shoe 232. A contact finger 284 is secured to leaf spring 280 and is adapted to engage the vanes 280 when the projection 282 wears away, to produce the noise which warns the vehicle operator. If necessary, a second resilient member similar to resilient member 52 of FIGS. 1–4 may be used in conjunction with resilient member 278 to provide a warning noise whenever either brake shoe wears a predetermined amount.

We claim:

1. In a disc brake including a caliper housing a rotor rotatable about an axis having a pair of opposed friction faces, the periphery of said rotor between said faces having solid portions and open portions between said solid portions a pair of friction elements including friction material for engagement with said friction faces, and means for urging said friction elements into braking engagement with said friction faces when a brake application is effected, wherein the invention comprises resilient means carried by the caliper housing responsive to wear of the friction material of one of said friction elements, said wear responsive means including means normally held away from said periphery of the rotor but moving to engage said periphery of the rotor when the friction elements have worn to a predetermined thickness, whereby engagement of the wear responsive means with the solid portions and the open portions generates a pulsating noise upon rotation of said rotor.

2. The invention of claim 1:
said means responsive to wear of said one friction element being a resilient member carried by said caliper housing and extending over the periphery of said rotor.

3. The invention of claim 2:
the friction material of the friction element engageable with said one friction face including a radial projection extending from the edge of said friction material adjacent the periphery of the rotor, said projection initially holding the resilient member away from the rotor, said projection wearing away as the friction material on said one friction element wears to permit said resilient member to engage said periphery of the rotor when the friction material on said one friction element has worn to a predetermined thickness.

4. The invention of claim 3:
said resilient member including a relatively flat portion extending over the periphery of said one friction face, said relatively flat portion terminating in a depression, the tip of said depression being adapted to engage said periphery of the rotor.

5. The invention of claim 3:
said resilient member being carried by said friction element engageable with said one friction face.

6. The invention of claim 5:
said resilient member including a first portion extending generally parallel to said one friction face and secured to said one friction element, and a second portion projecting from said first portion and extending across the edge of said one friction element and over the periphery of said rotor.

7. The invention of claim 6:
said second portion comprising a relatively flat section extending across the periphery of said one friction face, said flat portion terminating in a depression, the tip of said depression adapted to engage said periphery of the rotor.

8. The invention of claim 7:
said friction element engaging said one friction face including said friction material, a backing plate, and rivets securing said friction material to said backing plate, said rivets also securing said resilient member to said backing plate.

9. The invention of claim 7:
said friction element engaging said one friction face including a backing plate mounting said friction material, said backing plate having an aperture, said first portion extending along the side of said backing plate opposite the side of the latter to which the friction material is attached, said first portion including a clip extending across one end of the friction element and terminating in a hook extending through said aperture to attach the resilient member to said friction element engaging the one friction face.

10. The invention of claim 1:
said solid portions being defined by radially extending vanes disposed between said friction faces, said vanes defining said open portions therebetween.

11. The invention of claim 1:
the friction material of the other friction element including a radial projection extending from the edge of said friction material adjacent the periphery of the rotor; and
another resilient member carried by said one friction element and extending across the periphery of the rotor to engage the projection on the other friction element, said projection on said other friction element wearing away as the friction material on said one friction element wears to permit said discontinuities when the friction material on the other friction element has worn to a predetermined thickness.

12. In a disc brake including a caliper housing a rotor rotatable about an axis and having a pair of opposed friction faces, a pair of friction elements including friction material for engagement with said friction faces, and means for urging said friction elements into braking engagement with said friction faces, wherein the invention comprises a projection extending from the edge of the friction material comprising one of said friction elements adjacent the periphery of the rotor, and resilient means carried by the caliper housing extending over the periphery of said projection and also extending over the periphery of the rotor, said projection holding said means extending over the periphery of said projection and over the periphery of said rotor away from the periphery of the rotor, said projection wearing away as said friction material wears away, whereby the means extending over the periphery of said projection and over the periphery of said rotor is permitted to engage said rotor to generate noise when said projection is worn away.

13. The invention of claim 12:
said means extending over the periphery of said projection and the periphery of said rotor being a resilient member carried by said caliper housing;
said resilient member including a relatively flat portion extending over the periphery of said one friction face, said relatively flat portion terminating in a depression, the tip of said depression being adapted to engage said periphery of the rotor.

14. The invention of claim 12:
said means extending over the periphery of said projection and the periphery of said rotor being a resilient member carried by said caliper housing;
said resilient member being carried by said friction element engageable with said one friction face.

15. The invention of claim 14:
said resilient member including a first portion extending generally parallel to said one friction face and secured to said one friction element, and a second portion projecting from said first portion and extending across the edge of said one friction element and over the periphery of said rotor.

16. The invention of claim 15:
said second portion comprising a relatively flat section extending across the periphery of said one friction face, said flat portion terminating in a depression, the tip of said depression adapted to engage said periphery of the rotor.

17. The invention of claim 16:
said friction element engaging said one friction face including said friction material, a backing plate, and rivets securing said friction material to said backing plate, said rivets also securing said resilient member to said backing plate.

* * * * *